(12) United States Patent
Marsaly et al.

(10) Patent No.: US 8,646,502 B2
(45) Date of Patent: Feb. 11, 2014

(54) RUN-FLAT DEVICE FOR A MOTOR VEHICLE, MOUNTED ASSEMBLY INCORPORATING SAME, AND MANUFACTURING AND ASSEMBLY METHOD FOR SAME

(75) Inventors: Olivier Marsaly, Princeton, NJ (US); Bruno Pelletier, Persan (FR); Sébastien Mathieu, Crouy en Thelle (FR); Stéphane Auvray, Verderonne (FR)

(73) Assignee: Hutchinson, Paris (FR)

( * ) Notice: Subject to any disclaimer, the term of this patent is extended or adjusted under 35 U.S.C. 154(b) by 383 days.

(21) Appl. No.: 12/997,068

(22) PCT Filed: Jun. 8, 2009

(86) PCT No.: PCT/FR2009/000669
§ 371 (c)(1),
(2), (4) Date: Mar. 23, 2011

(87) PCT Pub. No.: WO2009/150329
PCT Pub. Date: Dec. 17, 2009

(65) Prior Publication Data
US 2011/0162774 A1 Jul. 7, 2011

(30) Foreign Application Priority Data

Jun. 13, 2008 (FR) ..................... 08 03320

(51) Int. Cl.
*B60C 17/00* (2006.01)
*B60C 17/04* (2006.01)
*B29D 30/06* (2006.01)

(52) U.S. Cl.
USPC .................. 152/516; 152/520; 156/110.1

(58) Field of Classification Search
None
See application file for complete search history.

(56) References Cited

FOREIGN PATENT DOCUMENTS

| EP | 298854 | * | 1/1989 |
| EP | 0 834 407 A1 | | 4/1998 |
| EP | 1512556 | * | 3/2005 |
| FR | 2 005 856 | | 12/1969 |
| GB | 2191453 | * | 12/1987 |
| JP | 10-119520 | * | 5/1998 |
| WO | WO 03/055702 | * | 7/2003 |

OTHER PUBLICATIONS

Machine translation of WO 03/055702, 2003.*
Search Report and Written Opinion for International Application No. PCT/FR2009/000669, dated Oct. 21, 2009; 15 pages.

* cited by examiner

*Primary Examiner* — Justin Fischer
(74) *Attorney, Agent, or Firm* — Alston & Bird LLP

(57) ABSTRACT

The present invention relates to a run-flat device for attaching a tubeless mounted assembly for a motor vehicle, and to such a mounted assembly incorporating said device. A device (30) according to the invention includes: a tire support structure (30), to be mounted around a rim having a plurality of pieces and comprising a reinforcing frame, and a bead lock means for locking the beads against the rim edge and connecting the support structure to the beads. According to the invention, the frame comprises an axial belt having at least one pair of ends opposite each other, separated by a connecting axial interstice, and connected therebetween by detachable connecting means (35, 36) for locking the belt, the support structure being radially split on both sides on the right of each interstice to enable the manual mounting of the device inside the casing by the gradual insertion therein of the structure, temporarily free of the connecting means.

18 Claims, 9 Drawing Sheets

RUN-FLAT DEVICE FOR A MOTOR VEHICLE, MOUNTED ASSEMBLY INCORPORATING SAME, AND MANUFACTURING AND ASSEMBLY METHOD FOR SAME

FIELD OF THE INVENTION

The present invention relates to a run-flat device intended to be fitted to a tubeless mounted assembly for a motor vehicle, to such a mounted assembly incorporating this device which allows a significant distance to be covered at a relatively high speed when the mounted assembly is partially or fully deflated, and to a method of manufacturing of and of assembling this mounted assembly. This run-flat device is intended to be mounted on a multi-block rim and the mounted assembly incorporating it is notably usable for fitting to a military vehicle intended to travel over all kinds of terrain including sandy terrain.

BACKGROUND OF THE INVENTION

Known run-flat devices for multi-block rims generally consist of an annular supporting structure which is mounted around the rim inside a tire cover and which is equipped with means of locking the beads of the cover against the flanges of the rim, such as annular wedges that connect the annulus to these beads.

Document EP-A-1 900 551 in the name of the Applicant Company describes such a device in which the supporting structure is split into annulus sectors, each comprising rigid supporting elements that are superposed and separated from one another two by two by an elastic layer consisting, for example, of a rubber/metal reinforcement composite in the form of an arc of a cylinder so that a relative axial movement of the sectors is permitted by the shearing of this layer under a lateral force applied to the structure.

SUMMARY OF THE INVENTION

It is an object of the present invention to provide a new run-flat device for a tubeless mounted assembly for a motor vehicle, which comprises a wheel rim in several blocks and a tire cover comprising beads mounted against flanges of this rim, this device comprising:
  an annular supporting structure which is intended to be mounted around the rim so as to support the cover following a drop in inflating pressure inside the mounted assembly, and which comprises a reinforcement, and
  locking means for locking the beads against the rim flanges and which are intended to connect the annular supporting structure to the beads,
which device can notably be mounted manually inside the cover while at the same time satisfactorily performing the run-flat function and the function of holding the beads in position.

To this end, a device according to the invention is such that the reinforcement comprises an axial belt having at least one pair of opposing ends separated by an axial connecting gap and connected together by removable connecting means for fastening the belt, said supporting structure being split right through radially in line with said or each gap so as to allow the device to be mounted manually inside the cover by gradually inserting into said cover the structure which is temporarily devoid of the connecting means.

As will be explained hereinbelow, these removable connecting means fitted to the axial belt (i.e. running overall in the direction of the axial width of the supporting structure) allow the split structure to be closed up from inside the cover by fitting and fastening these connecting means in order to tighten the belt.

According to another feature of the invention, said locking means may advantageously be formed as a single piece with said supporting structure, and they then preferably comprise two lateral protrusions extending axially one on each side of a radially interior zone of said supporting structure and substantially facing said belt.

It will be noted that the belt of the run-flat device according to the invention is advantageously designed both to confer upon the supporting structure incorporating it satisfactory ability to withstand the centrifugal effects encountered during driving, and also to provide a "beadlock" effect whereby the beads of the tire cover are locked against the rim flanges.

According to another feature of the invention, said removable connecting means may advantageously comprise at least one connecting flange which is fixed removably on a radially internal face of said supporting structure by fasteners, such as screws, which are inserted into this flange passing through the two ends of said or each corresponding pair of the belt.

It will be noted that the space between the two ends of the or each pair is dictated by the dimension that the connecting flange has in the circumferential direction when fixed under the belt, and that the or each connecting flange may allow adjustment of the inside diameter of the run-flat device.

Advantageously, said or each connecting flange may have a central projection extending in the axial direction at right angles to the fixing face of the flange, this projection being intended to sit in said gap and being designed to minimize the bending work of the or each corresponding flange (which in this instance is in the shape of a T).

Advantageously, also, each of said ends of the belt may comprise at least one support plate through which said fasteners are intended to pass and which extends radially projecting in relation to the remainder of the belt, which is preferably provided with a balancing weight diametrically opposite said support plates in order to minimize the out-of-balance under running conditions.

It will be noted that this balancing weight, which may be provided on the radially internal and/or external face of the belt, can preferably be used in the case of a supporting structure that is in a single piece and split.

According to another feature of the invention, said or each connecting flange preferably fits into a cavity which is formed in said internal face of the supporting structure and which is centered on said or each corresponding gap of said belt so that this flange is accessible via this internal face while for example being substantially level therewith.

According to another feature of the invention, said supporting structure may be compression-molded or injection-molded in at least one elastomeric or thermoplastic material, respectively, at least the radially external face of the structure intended to support the cover preferably being made of an elastomeric material.

Advantageously, this supporting structure may be obtained by overmolding said belt with an elastomeric or thermoplastic material so that this material radially and axially surrounds said belt, forming said or each cavity, for example by using an overmolding insert placed in the mold.

According to a first embodiment of the invention, the supporting structure forms a one-piece ring which is split right through in a single location on its circumference, which location is situated radially in line with said gap formed between said or one of said pair(s) of opposing ends of the belt (which may then just as well be formed as a single piece as it can from circular-arc portions butted together).

According to a second embodiment of the invention, said supporting structure is formed of several ring sectors shaped as circular arcs, which are butted together in the circumferential direction, either radially in line with the gaps formed between the pairs of opposing ends of said belt, which is also formed of several circular-arc portions butted together, or radially in line with a gap formed between a pair of opposing ends of the belt and in at least one other location on the circumference of this belt that has no said gap, the belt then being formed as a single piece and providing the device with circumferential continuity.

According to one example of how the invention may be embodied that is common to these first and second embodiments, said belt is made of metal. This belt may in this case comprise at least one metal sheet which may or may not be holed and which extends from two of the ends of said or each pair, this metal sheet being substantially cylindrical or shaped as an arc of a cylinder, when the belt is formed as a single piece, or when it is formed as separate portions butted together, respectively. As an alternative, the belt may comprise a plurality of metal cords which are axially juxtaposed and which extend from two of the ends of said or each pair, each of these cords being circular or shaped as an arc of a circle, when the belt is formed as a single piece, or when it is formed of separate portions butted together, respectively. According to yet another variant, the belt may comprise just the one single metal cord making outward and return passes between two of the ends of said or each pair and crimped to these ends for each outward and return portion.

According to another example of how the invention may be embodied, this also being common to these first and second embodiments, the belt is essentially made of a textile material. In such a case, it may comprise at least one fabric strip or cord, preferably inextensible, which extends from two of the ends of said or each pair, each textile strip or cord being cylindrical or shaped as an arc of a cylinder, when the belt is formed as a single piece, or when it is formed of separate portions butted together, respectively.

In general, it should be noted that the run-flat device according to the invention is preferably based on rubber with which said belt is coated using the aforementioned overmolding.

A tubeless mounted assembly according to the invention for a motor vehicle, comprising a wheel rim in several blocks, a tire cover comprising beads mounted respectively against axially internal and external flanges of the rim, and a run-flat device mounted around the rim between these flanges, is as defined hereinabove, with said locking means which are preferably formed as a single piece with the supporting structure and comprise two lateral protrusions which extend axially one on each side of a radially lower zone of said structure and which lock the beads of the cover against the flanges of the rim.

One method according to the invention for manufacturing and assembling this mounted assembly comprises, in succession:

a) overmolding said belt with at least one elastomeric or thermoplastic material so that this material radially and axially surrounds the belt, forming at least one cavity in the radially internal face of the supporting structure which is centered on said or each gap, the structure thus obtained being split radially in line with said or each cavity thus formed so that this structure then forms:

(i) either a single-piece ring split in a single location on its circumference, in line with the gap formed between said pair of opposing ends of the belt, which is, in this case, formed as a single piece or from circular-arc portions butted together, (ii) or several circular-arc ring sectors butted together in line with the gaps formed between the opposing ends of each pair of the belt, which is in this case formed by these portions butted together and forming these gaps, b) mounting the supporting structure thus obtained inside the cover, preferably by hand, by gradually inserting into the cover this structure devoid of the connecting means, either by deforming the two ends of the split ring that it forms in case (i) or by inserting the ring sectors that it forms in case (ii) one after the other and end to end, c) fitting and fastening the connecting means in the or each cavity formed in step a) so that the ends of said or each facing pair of the belt are joined together and so that the split ring is closed up in case (i) or so that the ring sectors are tightly packed end to end in case (ii), then d) assembling the blocks of the wheel rim under the radially internal face of this structure.

It will be noted that the device according to the invention thus has the advantage that it can be fitted by hand, something which is not generally the case for known run-flat devices with a rubber toric supporting structure.

BRIEF DESCRIPTION OF THE DRAWINGS

Other features, advantages and details of the present invention will become apparent from reading the following description of a number of examples of how the invention may be embodied, which are given by way of nonlimiting illustration, the description being given with reference to the attached drawings, among which.

DETAILED DESCRIPTION OF THE INVENTION

In the present description, the expressions "axially internal" and "axially external" refer respectively to the sides of the wheel rim which are intended to face toward the inside and toward the outside of the motor vehicle when a mounted assembly comprising this rim has been mounted on a vehicle.

Figure 1:
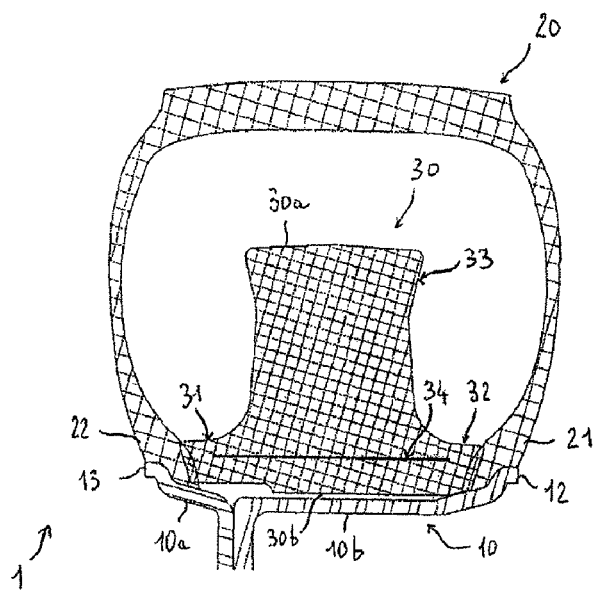
FIG. 1 is an axial half-section view of a mounted assembly incorporating a run-flat device according to the invention.

The mounted assembly 1 according to the invention illustrated in FIG. 1 comprises:
- a wheel rim 10 with two blocks 10a and 10b which are joined together by fixing means (not illustrated) of the bolt type and which respectively have axially internal and external flanges 12 and 13 delimiting two rim seats extending axially from the flanges 12 and 13,
- a tire cover 20 the beads 21 and 22 of which are mounted resting against these seats, and
- a run-flat device 30 mounted around a substantially flat bottom of the rim 10 inside the cover 20 and intended to support the latter following a drop in inflation pressure inside the mounted assembly 1 while at the same time locking the beads 21 and 22 against the rim flanges 12 and 13.

The run-flat device 30 according to the example in FIG. 1 consists of an annular supporting structure, preferably made of rubber, having two lateral protrusions 31 and 32 running axially on each side of a radially interior and maximum width zone of the device 30 and which are designed to lock the beads 21 and 22 against the rim flanges 12 and 13. The remainder of the device 30 has, radially toward the outside of these locking protrusions 31 and 32, an axial section of substantially rectangular shape, except in a radially external zone of the structure where it widens in this example into a portion 33 substantially shaped as an isosceles trapezium. It will, however, be noted that the devices according to the invention may have other external shapes, provided that they are able to lock the beads 21 and 22 and to support the cover 20.

Figure 4:
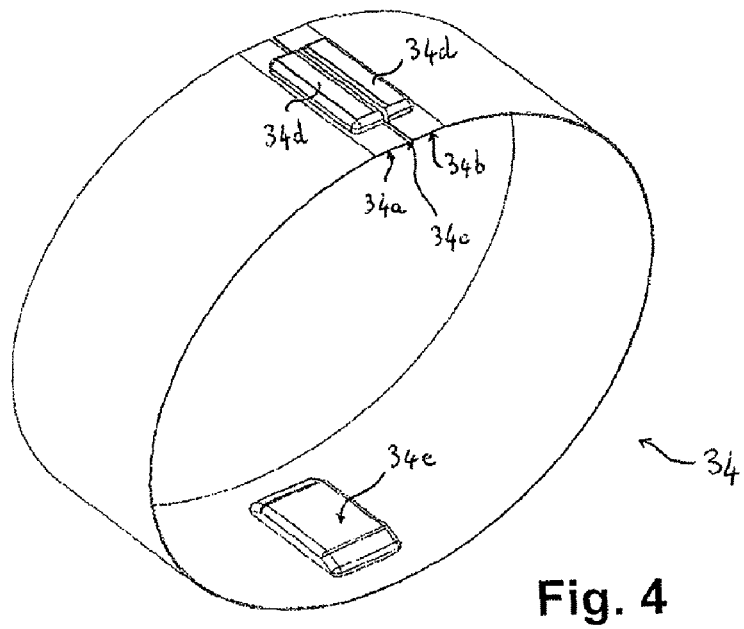
FIG. 4 is a perspective view of this belt according to one example of how the invention is embodied.

The device 30 is reinforced in this radially interior zone by an axial belt 34 to 434 (in the example of FIG. 1, more or less radially centered on the protrusions 31 and 32) which has an open geometry, in as much as it is defined by at least one pair of opposing ends 34a and 34b to 434a and 434b which are separated by an axial connecting gap 34c to 434c (visible in FIGS. 4 to 8), the or each pair of ends 34a and 34b to 434a and 434b being joined together by a removable connecting flange 35, 135 (see FIGS. 10 and 11) able to fasten the belt 34 to 434 via fasteners 36 of the screw type, as will be explained hereinbelow with reference to FIG. 4 et seq.

Figure 2:
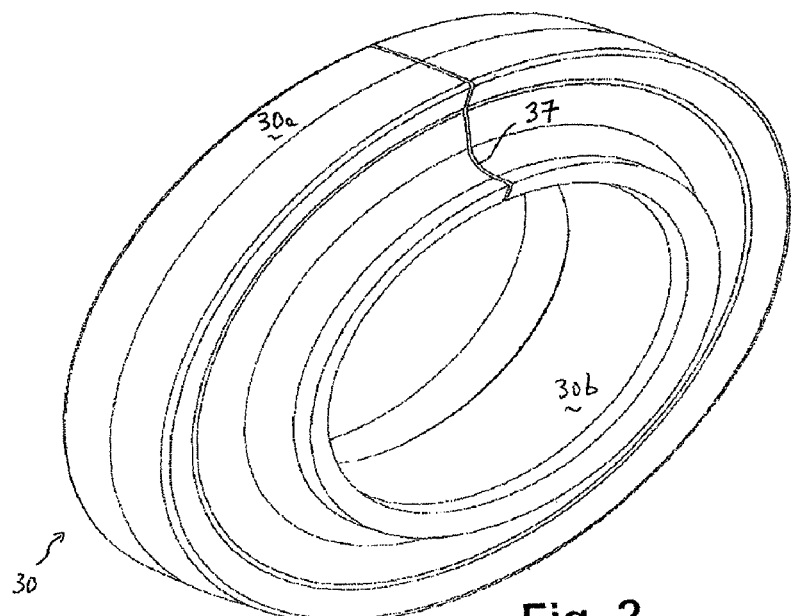
FIG. 2 is a perspective view of a run-flat device according to a first embodiment of the invention showing, in a view radially from the outside, the slit in the annulus formed as a single piece by this device.
Figure 3:
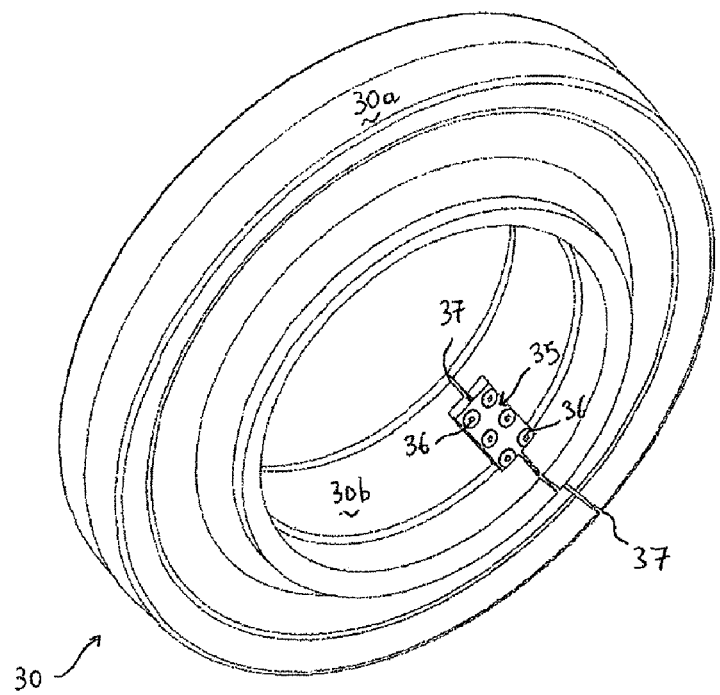
FIG. 3 is a perspective view of the device of FIG. 2 from a different angle showing, viewed radially from the inside at the location of this slit, a connecting strap fitted to a pair of ends of a belt forming the reinforcement of the device.

In addition, and as illustrated by its slit 37 visible in FIGS. 2 and 3, the device 30 is split right through radially in line with the or each gap 34c to 434c (i.e. is split from one lateral side of the device 30 to the other and from the radially external face 30a to the radially internal face 30b thereof), so as to allow the device 30 to be mounted by hand inside the cover 20 by gradually inserting it into this cover without the flanges 35, 135.

In the embodiment examples of FIGS. 4 to 8, the belt 34 to 434 is formed as a single piece, and therefore has just one pair of ends 34a and 34b to 434a to 434b to be connected by the flange 35, 135. However, it will be noted that a belt according to the invention could be formed of at least two circular-arc portions butted together in the circumferential direction and thus defining at least two pairs of such ends which are respectively joined together by at least two flanges 35, 135.

Figure 5:
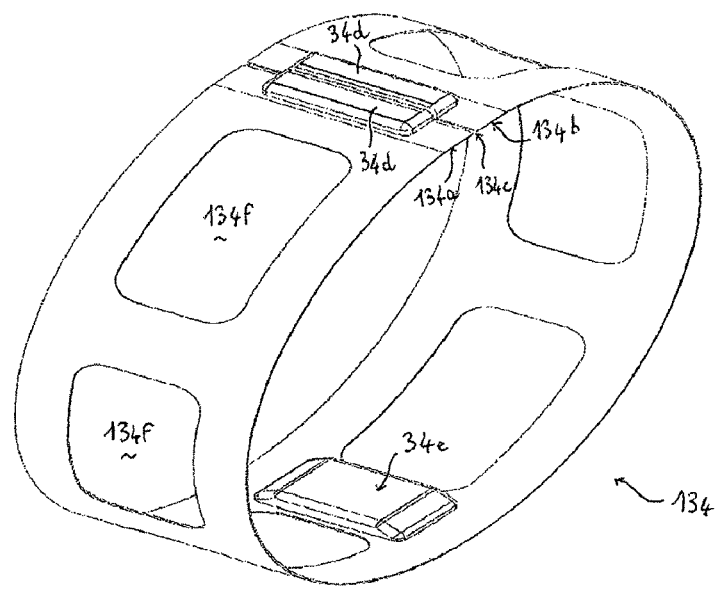
FIG. 5 is a perspective view of another belt according to the invention, corresponding to a variant of FIG. 4.
Figure 6:
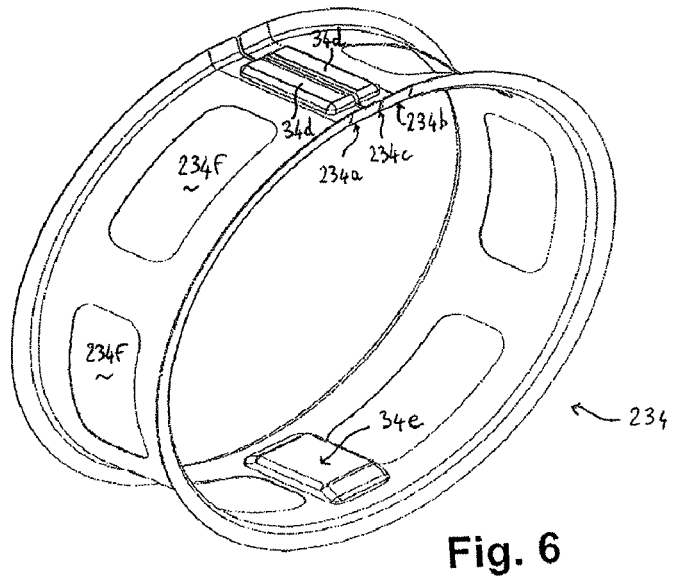
FIG. 6 is a perspective view of another belt according to the invention, corresponding to a variant of FIG. 5, FIGS. 7 and 8 are perspective views of two belts according to two other variants of the invention, respectively.

In the examples of FIGS. 4 to 6, the belt 34 to 234 is made of metal and may therefore in axial section have a flat geometry (as is the case in FIGS. 4 and 5) or a two-dimensional geometry (as is the case in FIG. 6).

As illustrated in FIG. 4, the belt 34 in this example comprises a solid (i.e. non-holed) cylindrical metal sheet which extends from the two ends 34a and 34b that are to be connected, which ends each comprise a perforated metal support plate 34d which is secured to the remainder of the belt 34, for example by welding, and through which the screws 36 that fasten the flange 35, 135 are intended to pass. FIG. 4 shows that the two support plates 34d both project radially outward with respect to the remainder of the belt 34, defining the axial gap 34c between them. Further, the belt 34 may be equipped with a balancing weight 34e diametrically opposite the support plates 34d so as to minimize the out-of-balance under running conditions, this weight 34e preferably being formed as a projection on the radially internal face of the belt 34.

The belt 134 according to the variant of FIG. 5 differs from that of FIG. 4 only in that it has a structure that is holed via slots 134f that are evenly spaced in the circumferential direction. As for the belt 234 in FIG. 6, it differs from the previous one only by its two lateral flanges which extend radially outward, in the manner of a reel, on each side of the slots 234f with which this belt 234 is holed.

Figure 7:
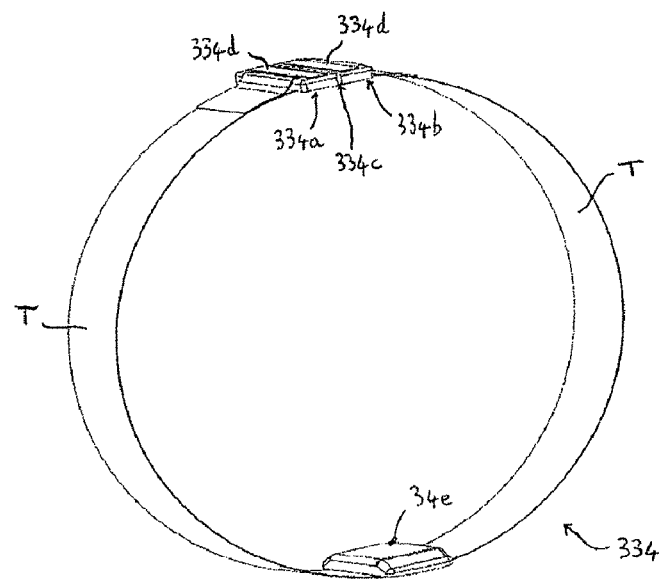
Figure 8:
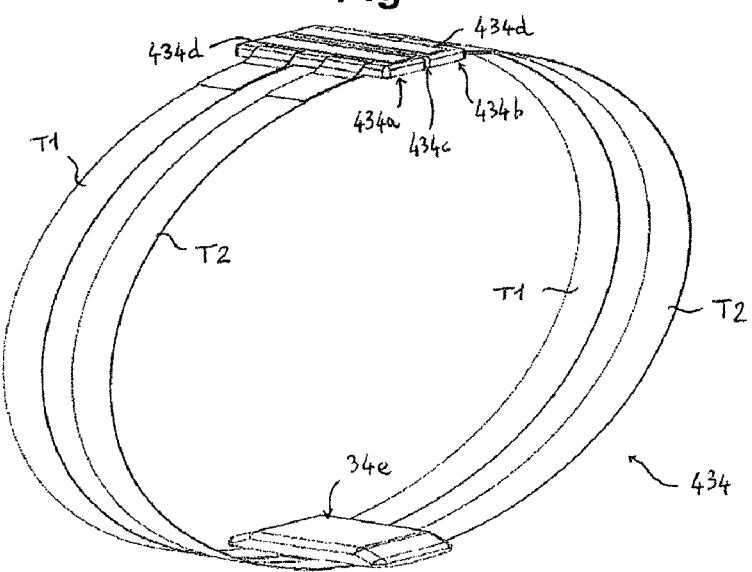

The belts 334 and 434 according to variants of FIGS. 7 and 8 are both essentially made of fabric, being provided at each of their two ends 334a and 334b, 434a and 434d with a perforated metal support plate 334d, 434b analogous to that of FIGS. 4 to 6 and which is connected to the fabric for example by stitching. In this case, it may comprise at least one annular strip of fabric T, T1, T2, preferably an inextensible fabric (two strips T1 and T2 axially juxtaposed such that they are spaced apart in the variant of FIG. 8) which extends from the two ends 334a and 334b, 434a and 434b.

Figure 13:
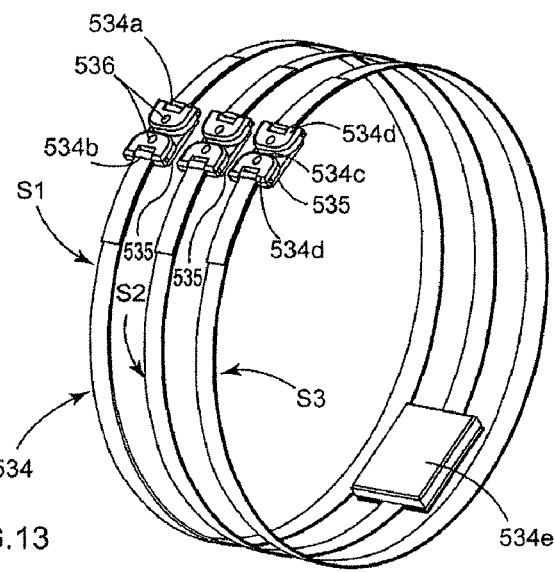
FIG. 13 is a perspective view of a belt of a run-flat device according to the invention according to a first variant of FIG. 8.

In the embodiment variant illustrated in FIG. 13, the belt 534 consists of n(n≥2) annular strips or bands S1, S2, S3 which are axially juxtaposed and closed up independently of one another (i.e. without being joined together) by n separate connecting flanges 535. More specifically, each band S1 to S3 has its two ends 534a and 534b respectively mounted on two support plates 534d which are joined together via their internal faces by a connecting flange 535 through all of which fasteners 536 pass. A balancing weight 534e has also been provided diametrically opposite the axial gap 534c of the belt 534 to minimize the out-of-balance under running conditions, this weight 534e in this example being formed as a protrusion on the internal face of only the middle band S2.

Figure 14:
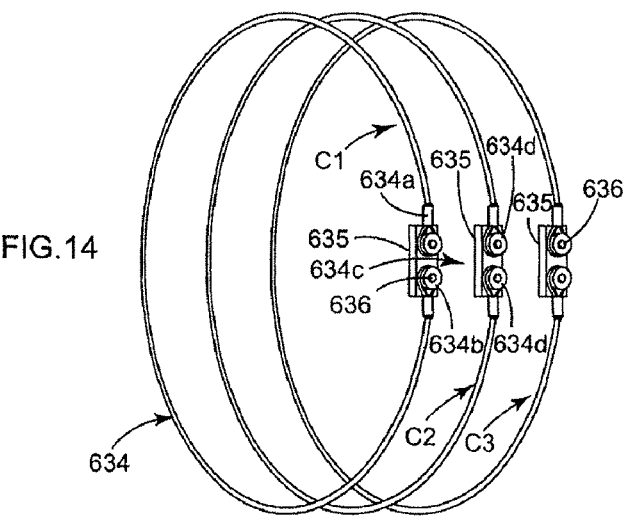
FIG. 14 is a perspective view of a belt of a run-flat device according to the invention, according to a second variant of FIG. 8.
Figure 15:
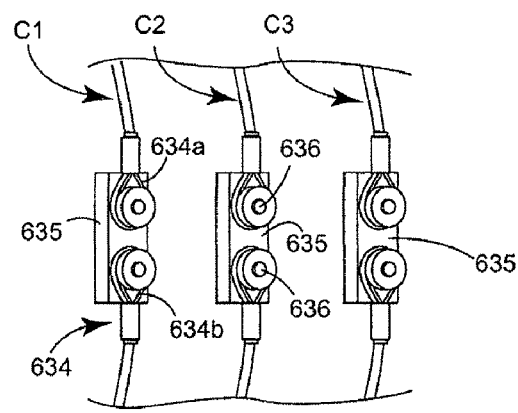
FIG. 15 is a view of a detail of FIG. 14.

In the variant of FIGS. 14 and 15, the individual bands S1 to S3 of FIG. 13 have been replaced with n annular metal cords C1 to C3 that are independent (i.e. not joined together) and axially juxtaposed in a spaced-apart manner, which are closed by n separate connecting flanges 635 to form the belt 634 in the axial connecting gap 634c thereof. Each flange 635, which is fitted with fasteners 636, is mounted under two supports 634*d* that accept the respective wound ends 634*a* and 634*b* of the corresponding cord C1 to C3 (which, for example, is made of steel).

According to another, unillustrated, variant of the belt according to the invention, this belt may comprise a plurality of metal cords which are axially juxtaposed in a spaced-apart manner but which are joined together by one and the same common connecting flange at the or each axial gap and which run from two of the ends of the or each pair (each cord being shaped as a circle or a circular arc according to whether the belt is formed as a single piece or whether it is formed of separate circular-arc portions butted together), the connection between these cords and the support plates of the or each pair of ends being achieved, for example, by crimping or by cable clamps.

Figure 9:
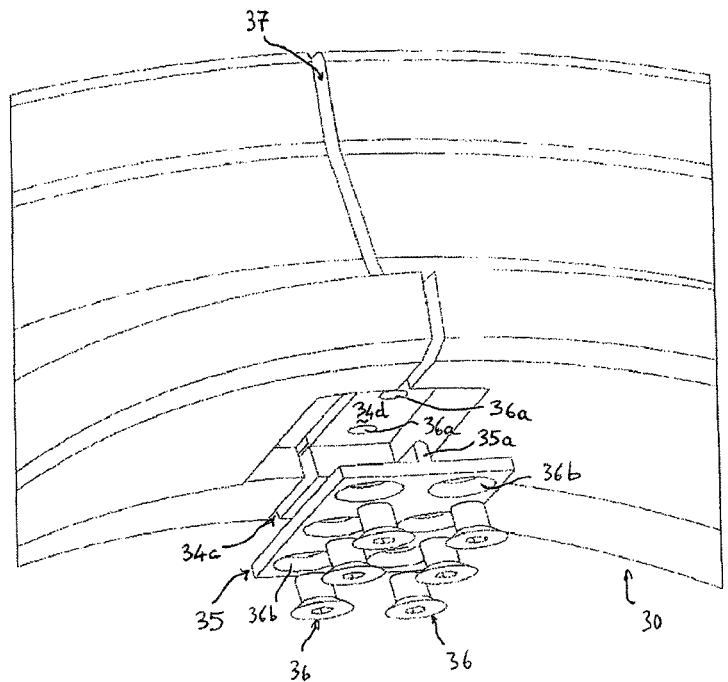
FIG. 9 is an exploded and perspective view of a detail of FIG. 3, showing how a connecting strap is fitted and fixed to the two opposing ends of the belt via fasteners.
Figure 10:
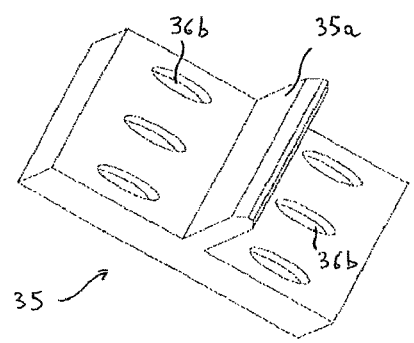
FIG. 10 is a perspective view of the strap of FIG. 9, without these fasteners.
Figure 11:
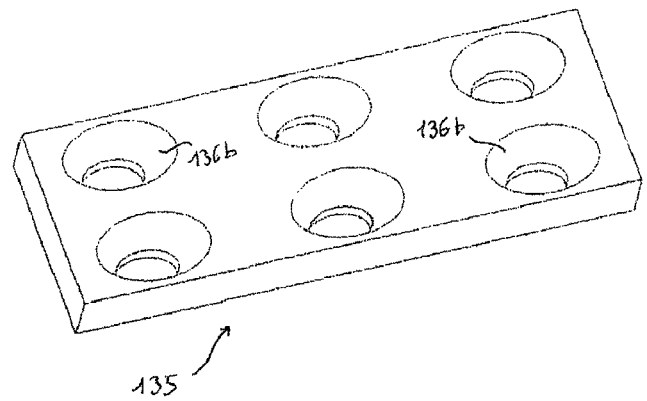
FIG. 11 is a perspective view of a connecting strap according to a variant of FIG. 10, and likewise without fasteners.

With reference to FIGS. 9 to 11, the or each connecting flange 35, 135 of rectangular shape fitted to the belt 34 to 434 can be fixed removably through the two support plates 34*d*, 334*d*, 434*d* with which the two facing ends 34*a* and 34*b* to 434*a* and 434*b* of the belt are provided and which for this purpose have tapped orifices 36*a* through which the screws 36 that fasten the flange 35, 135 to the belt 34 to 434 are intended to pass (the space between these two ends 34*a* and 34*b* to 434*a* and 434*b* corresponds to the width of the flange 35, 135 in the circumferential direction when it is fixed under the belt 34 to 434).

To achieve this fixing, the or each flange 35, 135 has through-orifices 36*b* for the screws 36 which, in the example of FIGS. 9 and 10, are split into two rows of orifices 36*b* arranged respectively one on each side of a central projection 35*a* running in the axial direction at right angles to the two faces of the flange 35 through which these orifices 36*b* pass. This central projection 35*a* is intended to sit in the gap 34*c* to 434*c* and minimize the bending work of the flange 35 under running conditions. As a variant and as illustrated in FIG. 11, the two faces of the or each flange 135 which are provided with orifices 136*b* through which the screws 36 are intended to pass may both be flat.

Figure 12:
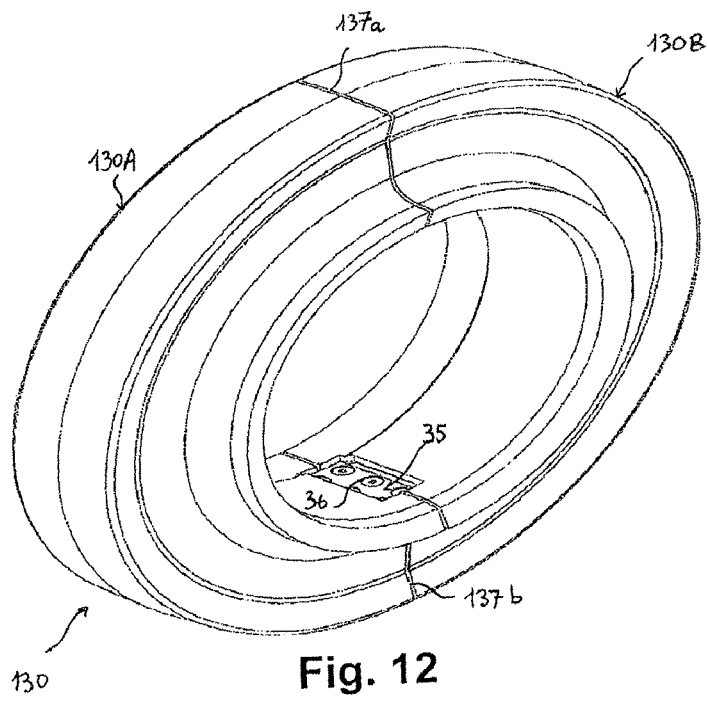
FIG. 12 is a perspective view of a run-flat device according to a second embodiment of the invention and showing, viewed radially from the inside between two distinct sectors of this device, one of the two connecting straps fitted to a pair of opposing ends of the reinforcing belt of this device.

FIG. 12 shows a run-flat device 130 according to the second embodiment of the invention, which differs from the device 30 according to the aforementioned first embodiment in that it is formed of two ring sectors 130A and 130B each in the form of a semicircle, which are butted together in the circumferential direction, while being separated from one another by two slits 137*a* and 137*b* at the two gaps (not visible) formed between each pair of opposing ends of the belt, which is likewise formed of two semicircular portions butted together and tightened against one another by two flanges 35, 135.

The run-flat device 30, 130 according to the invention is advantageously obtained as follows:

a) the belt 34 to 434 is overmolded, preferably with rubber, so that this rubber radially and axially surrounds this belt, forming, by means of an overmolding insert placed in the mold, at least one blind cavity in the radially internal face 30*b* of the supporting structure which is centered on the or each gap 34*c* to 434*c* (formed between the two ends 34*a* and 34*b* to 434*a* and 434*b* of the or each pair of ends of the belt), the structure thus obtained being radially split in line with the or each cavity, to form:

(i) a one-piece ring split at a single location 37 on its circumference in line with this gap 34*c* to 434*c*, the belt 35, 135 in this case being formed as a single piece or of circular-arc portions butted together, or (ii) several circular-arc ring sectors 130A and 130B separated from one another by the slits 137*a* and 137*b*, butted together in line with the gaps formed between the pairs of opposing ends of the belt, which in this case is formed by these portions butted together forming these gaps, b) this device 30, 130 thus split and without the or each flange 35, 135 is mounted inside the cover 20, preferably by hand, either by deforming the two ends of the split ring in case (i), or by inserting the ring sectors 130A and 130B end to end one after the other, in case (ii), c) the or each flange 35, 135 is fixed and then fastened in the or each cavity formed in step a) so that the ends 34*a* and 34*b* to 434*a* and 434*b* of the or each facing pair of the belt 34 to 434 are joined together, and so that the split ring is closed up in case (i) or so that the ring sectors 130A and 130B are clamped end to end in case (ii), then d) the two blocks 10*a* and 10*b* of the rim 10 are assembled under the radially internal face 30*b* of the device 30, 130.

Figure 16:
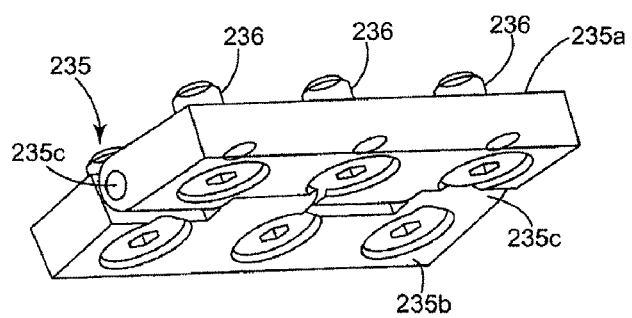
FIG. 16 is a perspective view of a connecting strap of a belt according to the invention according to a variant of FIG. 10, this strap being fitted with fasteners.

The connecting flange 235 illustrated in the variant of FIG. 16 essentially differs from that of FIG. 11 in that it is formed of two parts 235*a* and 235*b* each of which is provided with fasteners 236 and which are articulated to one another by hinges 235*c* arranged in a staggered configuration along the longitudinal mid-plane of the flange 235. The hinges 235*c* are situated in the axial direction (i.e. in the transverse direction, just like the projection 35*a* of the flange 35 in FIG. 9) of the run-flat device once the latter has been assembled. This articulated flange 235 is notably able to absorb bending stresses to which the corresponding run-flat device is subjected under running conditions, so as to make this device more flexible.

Figure 17:
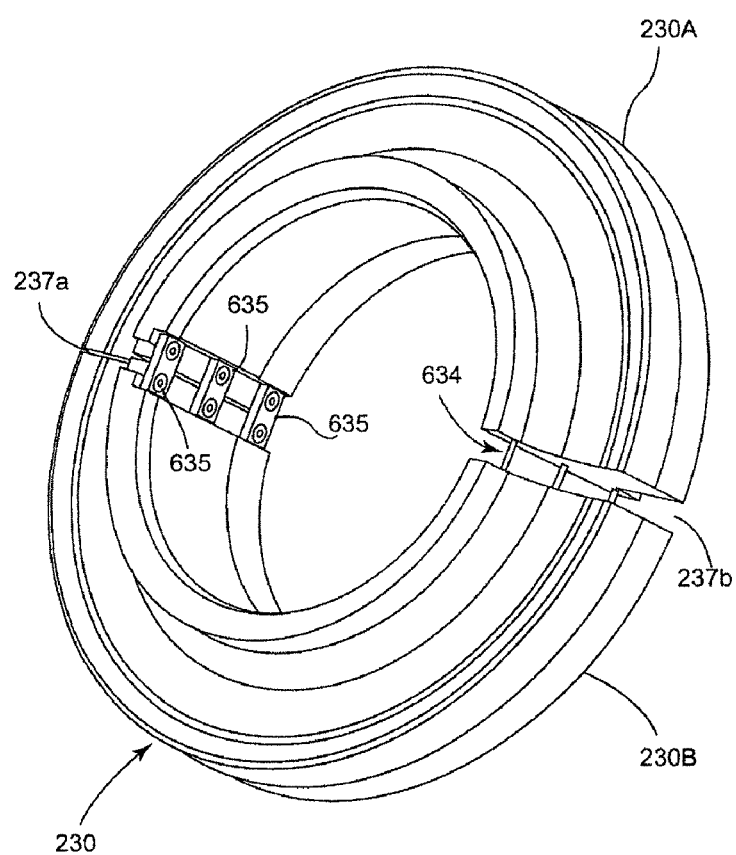
FIG. 17 is a perspective view of a run-flat device with a belt that is a one-piece component but has a supporting structure made up of annulus sectors, according to a variant of FIG. 3.

The run-flat device 230 according to the variant of FIG. 17 differs from that of FIG. 3 in that its belt 634 (in this example made up of cords C1 to C3 like that FIG. 14, it being emphasized that any other belt structure can be used in this variant) which is split, being formed as a single piece, is here surrounded by a supporting structure 230 in the form of several circular-arc ring sectors 230A and 230B (two semicircular sectors in this embodiment example). In the example of FIG. 17, the sectors 230A and 230B butted together define a first axial slit 237*a* radially in line with the axial gap 634*c* formed between the pair of opposing ends 634*a* and 634*b* of the cords C1 to C3 (which are respectively closed up by the flanges 635) and a second axial slit 237*b* at a different location (for example diametrically opposite) of the belt 634. Thus, the latter alone provides the device 230 with circumferential continuity of this slit 237*b*, making a further contribution toward the flexibility of this device 230.

The invention claimed is:

1. A run-flat device intended to be fitted to a tubeless mounted assembly for a motor vehicle, which comprises a wheel rim in several blocks and a tire cover comprising beads mounted against flanges of the rim, the device comprising:

an annular supporting structure which is intended to be mounted around the rim so as to support the cover following a drop in inflating pressure inside the mounted assembly, and which comprises a reinforcement, and locking means for locking the beads against the rim flanges and which are intended to connect the supporting structure to the beads, characterized in that the reinforcement comprises an axial belt having at least one pair of opposing ends separated by an axial connecting gap and connected together by removable connecting means for fastening the belt, said supporting structure being split right through radially in line with said or each gap so as to allow the device to be mounted manually inside the cover by gradually inserting into said cover said structure which is temporarily devoid of said connecting means, said removable connecting means comprising at least one connecting flange which is fixed removably on a radially internal face of said supporting structure by fasteners which are inserted into this flange.

2. The device as claimed in claim 1, characterized in that said locking means are formed as a single piece with said supporting structure.

3. The device as claimed in claim 2, characterized in that said locking means comprise two lateral protrusions extending axially one on each side of a radially interior zone of said supporting structure and substantially facing said belt.

4. The device as claimed in claim 1, wherein said fasteners pass through the two ends of said or each corresponding pair of the belt.

5. The device as claimed in claim 4, characterized in that said or each connecting flange has a central projection extending in the axial direction at right angles to the fixing face of the flange, this projection being intended to sit in said gap and being designed to minimize the bending work of the or each corresponding flange under running conditions.

6. The device as claimed in claim 4, characterized in that each of said ends of the belt comprises at least one support plate through which said fasteners are intended to pass and which extends radially projecting in relation to the remainder of the belt, which is preferably provided with a balancing weight diametrically opposite said support plates in order to minimize the out-of-balance under running conditions.

7. The device as claimed in claim 4, characterized in that said or each connecting flange fits into a cavity which is formed in said internal face of the supporting structure and which is centered on said or each corresponding gap of said belt so that this flange is accessible via this internal face while preferably being substantially level therewith.

8. The device as claimed in claim 1, characterized in that said supporting structure (is compression-molded or injection-molded in at least one elastomeric or thermoplastic material, respectively, at least the radially external face of the structure intended to support the cover preferably being made of an elastomeric material.

9. The device as claimed in claim 7, characterized in that said supporting structure is obtained by overmolding said belt with an elastomeric or thermoplastic material so that this material radially and axially surrounds said belt, forming said or each cavity.

10. The device as claimed in claim 1, characterized in that said supporting structure forms a one-piece ring which is split right through in a single location on its circumference, which location is situated radially in line with said gap formed between said or one of said pair(s) of opposing ends of the belt.

11. The device as claimed in claim 1, characterized in that said supporting structure is formed of several ring sectors shaped as circular arcs, which are butted together in the circumferential direction,
  either radially in line with the gaps formed between the pairs of opposing ends of said belt, which is also formed of several circular-arc portions butted together,
  or radially in line with a gap formed between a pair of opposing ends of the belt and in at least one other location on the circumference of this belt that has no said gap, the belt then being formed as a single piece and providing the device with circumferential continuity.

12. The device as claimed in claim 1, characterized in that said belt is made of metal.

13. The device as claimed in claim 12, characterized in that said belt comprises at least one metal sheet which may or may not be holed and which extends from two of the ends of said or each pair, this metal sheet being substantially cylindrical or shaped as an arc of a cylinder, when the belt is formed as a single piece, or when it is formed as separate portions butted together, respectively.

14. The device as claimed in claim 12, characterized in that said belt comprises a plurality of metal cords which are axially juxtaposed and which extend from two of the ends of said or each pair, each of these cords being circular or shaped as an arc of a circle, when the belt is formed as a single piece, or when it is formed of separate portions butted together, respectively.

15. The device as claimed in claim 1, characterized in that said belt is essentially made of a textile material, comprising at least one fabric strip or cord, preferably inextensible, which extends from two of the ends of said or each pair, each textile strip or cord being cylindrical or shaped as an arc of a cylinder, when the belt is formed as a single piece, or when it is formed of separate portions butted together, respectively.

16. A tubeless mounted assembly for a motor vehicle, comprising a wheel rim in several blocks, a tire cover comprising beads mounted respectively against axially internal and external flanges of the rim, and a run-flat device mounted around the rim between these flanges, characterized in that this device is as defined in claim 1.

17. The mounted assembly as claimed in claim 16, characterized in that said locking means are formed as a single piece with said supporting structure and preferably comprise two lateral protrusions which extend axially one on each side of a radially lower zone of said supporting structure and which lock the beads of the cover against the flanges of the rim.

18. A method of manufacturing and assembling a mounted assembly as claimed in claim 16, characterized in that it comprises, in succession:
  a) overmolding said belt with at least one elastomeric or thermoplastic material so that this material radially and axially surrounds the belt, forming at least one cavity in the radially internal face of the supporting structure which is centered on said or each gap,
  the structure thus obtained being split radially in line with said or each cavity thus formed so that this structure then forms:
  (i) either a single-piece ring split in a single location on its circumference, in line with the gap formed between said pair of opposing ends of the belt, which is, in this case, formed as a single piece or from circular-arc portions butted together,
  (ii) or several circular-arc ring sectors butted together in line with the gaps formed between the opposing ends of each pair of the belt, which is in this case formed by these portions butted together and forming these gaps,
  b) mounting the supporting structure thus obtained inside the cover, preferably by hand, by gradually inserting into the cover this structure devoid of the connecting means, either by deforming the two ends of the split ring that it forms in case (i) or by inserting the ring sectors that it forms in case (ii) one after the other and end to end,
  c) fitting and fastening the connecting means in the or each cavity formed in step a) so that the ends of said or each facing pair of the belt are joined together and so that the split ring is closed up in case (i) or so that the ring sectors are tightly packed end to end in case (ii), then
  d) assembling the blocks of the wheel rim under the radially internal face (30b) of this structure.

* * * * *